Jan. 14, 1958 M. R. WINKLER 2,819,801
AUTOMATIC ELEVATING SHELF DEVICE
Filed June 30, 1955 3 Sheets-Sheet 1

INVENTOR.
MORRIS R. WINKLER
BY
ATTORNEY

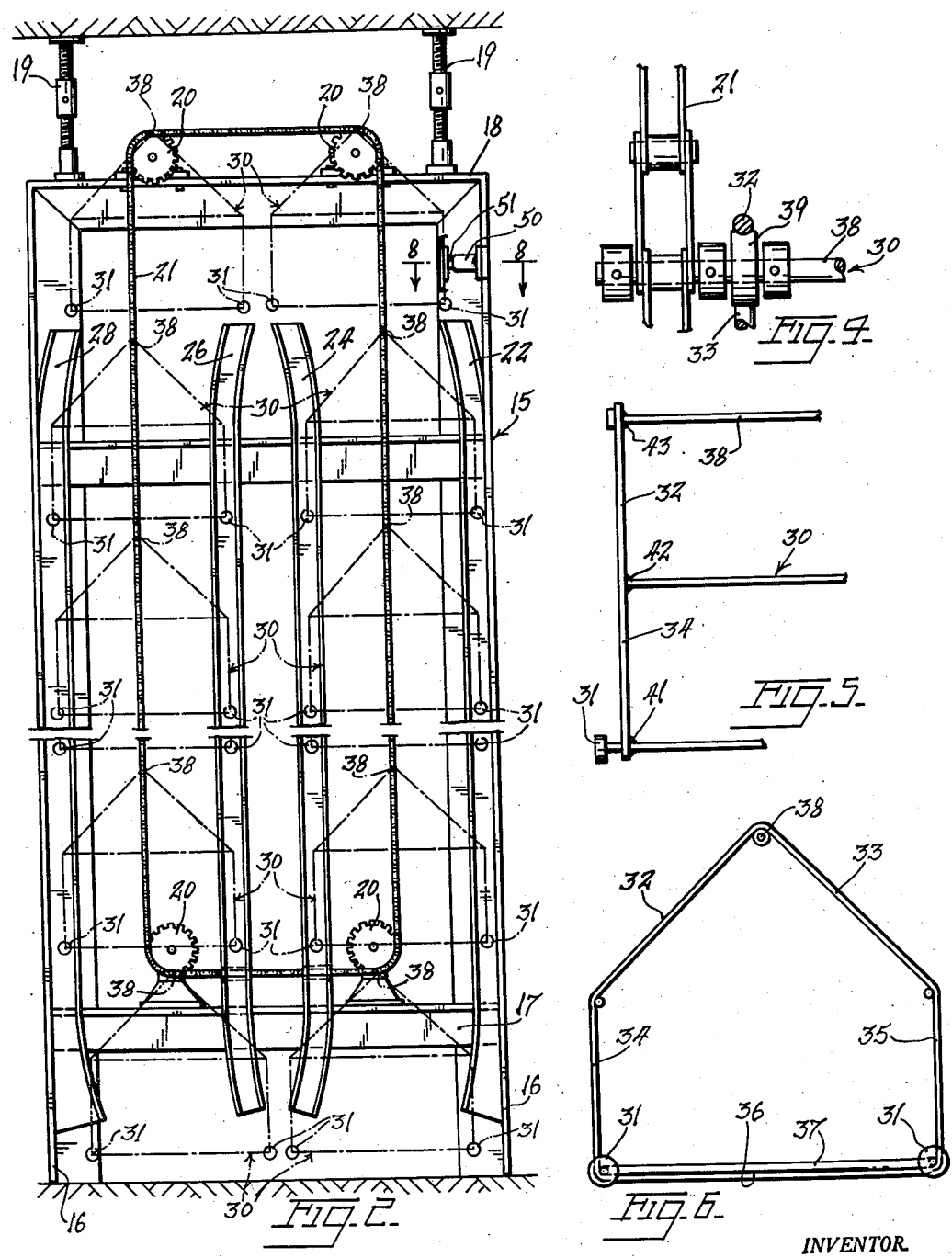

Jan. 14, 1958  M. R. WINKLER  2,819,801
AUTOMATIC ELEVATING SHELF DEVICE
Filed June 30, 1955  3 Sheets-Sheet 3
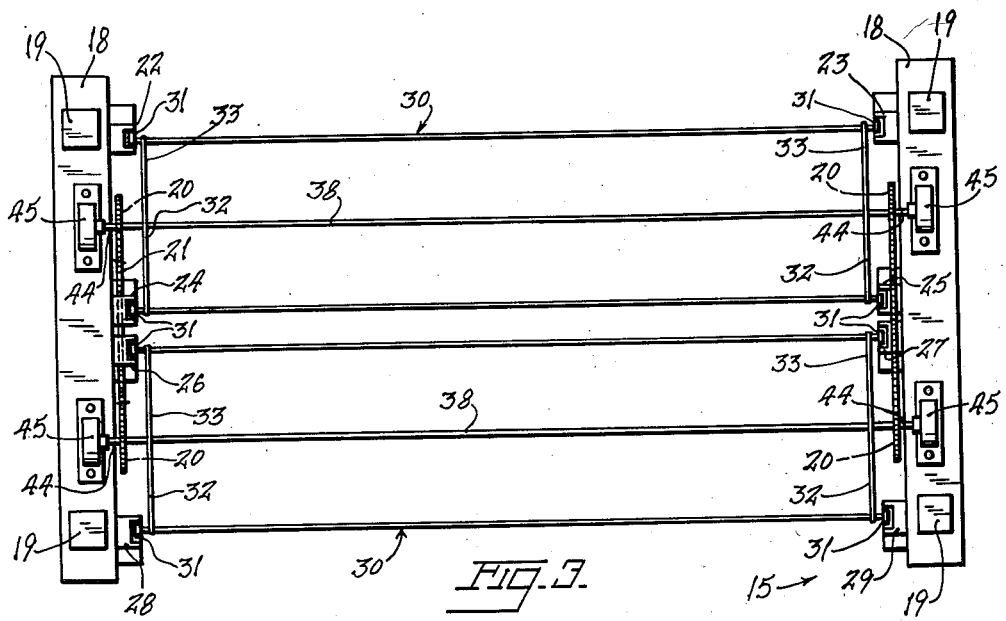
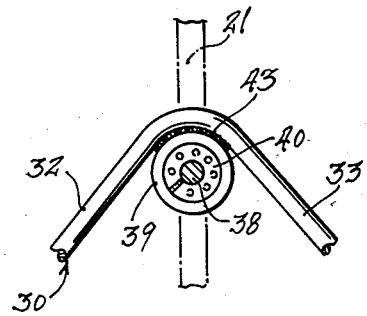
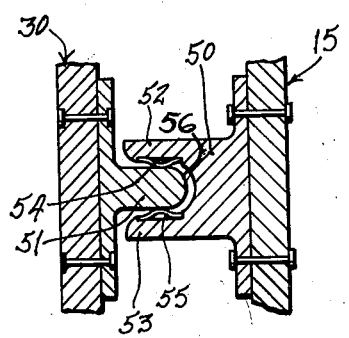
INVENTOR.
MORRIS R. WINKLER
BY
ATTORNEY

United States Patent Office 2,819,801
Patented Jan. 14, 1958

2,819,801

AUTOMATIC ELEVATING SHELF DEVICE

Morris R. Winkler, Far Rockaway, N. Y.

Application June 30, 1955, Serial No. 519,181

1 Claim. (Cl. 211—121)

This invention relates to new and useful improvements in conveyor and storing devices.

More particularly, the present invention proposes the construction of an improved automatic elevating shelf device which can be worked by hand or power and which can be used for show window displays, for kitchen cabinets from ceiling to floor, for storage of articles of unlimited heights and weights, for lifting and loading personnel and materials on construction projects, for loading and unloading aircraft and ships, as storage and lifting of men and aircraft on aircraft carriers, for lookout towers, for storage and parking cars where space is limited and height is not limited, for elevators in mine shafts where time and speed is important in case of disaster, and for restaurants as a conveyor between floors for circulating food through a freezing element to keep it fresh and in better condition.

As a further object, the present invention proposes forming the device so that it can be used as an elevator and the shelves of the device made half the size for the regular elevator cars but with a large number of shelves for each device so that each floor can have two shelves or cars, one going up and the other coming down and automatically timed if desired.

Still another object of the present invention proposes constructing the device with a frame having two sets of spaced guide members or tracks and a number of shelves mounted in the frame for moving therein with guide rollers to fit in the guide members or track on the frame.

Another object of the invention proposes forming the device with aligning means to dampen the swing or vibration of the shelves as they cross from one set of guide members to the other and to align them with the guide members for the guide rollers to fit in the guide members.

For further comprehension of the invention, and of the objects and advantages thereof, reference will be had to the following description and accompanying drawings, and to the appended claim in which the various novel features of the invention are more particularly set forth.

In the accompanying drawings forming a material part of this disclosure:

Fig. 2 is a sectional view taken on line 2—2 of Fig. 1.

Fig. 3 is a top plan view of the structure shown in Figs. 1 and 2.

Fig. 4 is a fragmentary detail view showing the connection of shelf to chain.

Fig. 5 is a detail fragmentary view showing typical shelf construction.

Fig. 6 is an end view of one shelf frame and shelf.

Fig. 7 is a detail fragmentary view showing shelf construction.

Fig. 8 is an enlarged sectional view taken on line 8—8 of Fig. 2.

Figure 1:
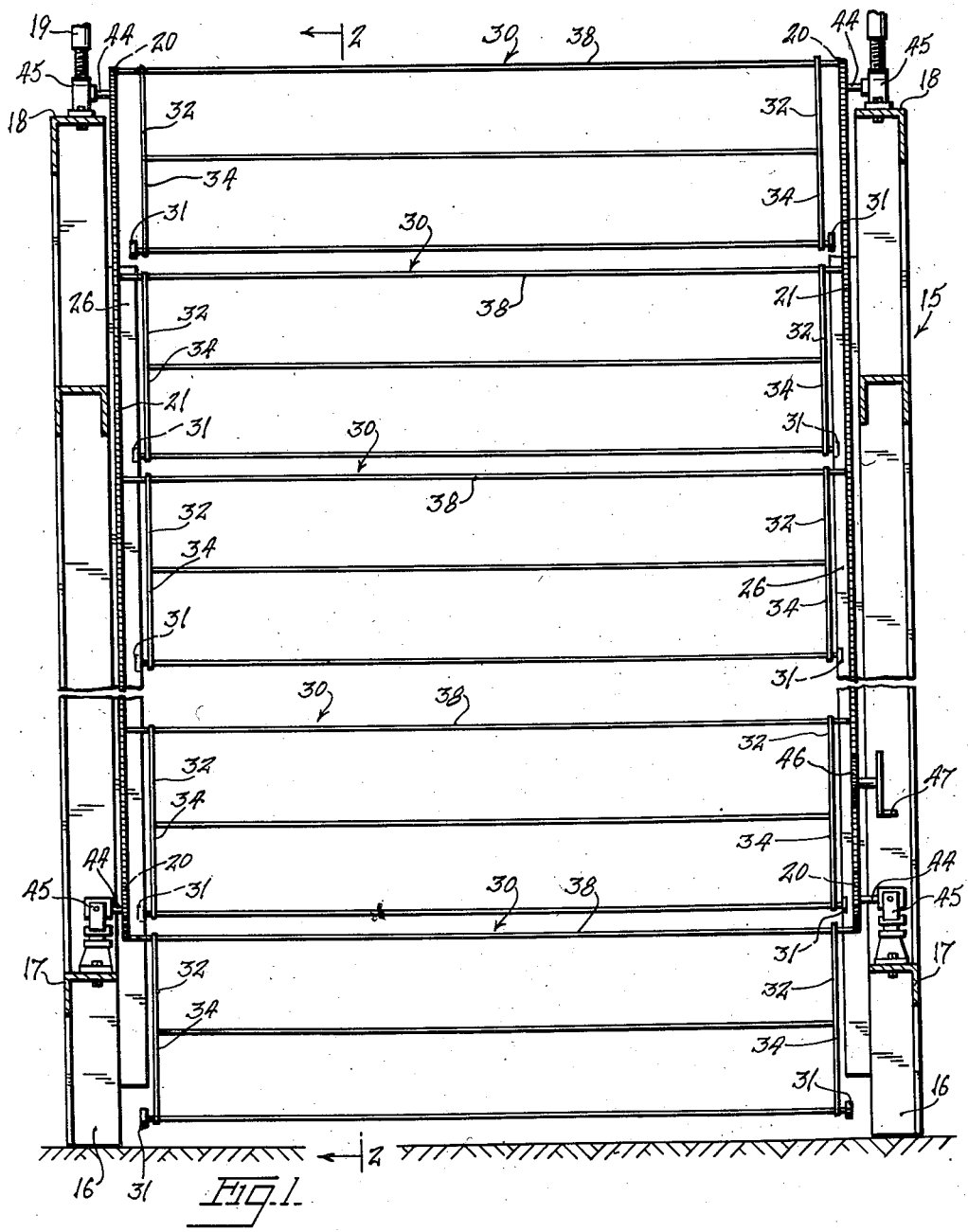
Fig. 1 is a front view of a device constructed and arranged in accordance with the present invention with parts broken away.

The automatic elevating shelf device of the present invention has a frame 15 which may be made of angle iron or the like. Frame 15 has legs 16, a lower cross member or platform 17 and an upper cross member or platform 18. Adjustable jacks 19 are mounted on the upper cross member or platform 18 securely to hold the frame rigid in a room or like space having a wall and ceiling or the like.

Spaced sprockets 20 are mounted on the upper cross member 18 and lower cross member 17 of the frame and continuous chains 21 are provided between the sprockets.

Vertically disposed and fixed to the frame 15 are two sets of spaced pairs of guide members 22, 23, 24, 25, 26, 27, 28 and 29. These guide members are channels or tracks having curved upper and lower ends.

A plurality of shelves 30 are provided movably mounted in the frame 15. Shelves 30 have guide rollers 31 adapted to fit in the channels or tracks 22, 23, 24, 25, 26, 27, 28 and 29 to guide the shelves vertically up and down the frame.

Shelves 30 have frames with angularly disposed upper members 32 and 33, parallel side members 34 and 35 and a bottom member or side 36 at right angles to the sides 34 and 35. A shelf bottom 37 is mounted on the bottom member 36. The shelves may be plastic covered with sliding doors (not shown) if desired.

Each shelf is pivotally mounted on and dependent from a center rod 38. A steel set screw collar 39 is welded or otherwise secured to the upper members 32 and 33 of each shelf and the collar is connected by ball bearings 40 to the center rod 38 so that the shelf can pivot and swing on the rod and stay in dependent untilted position at all times. The shelf frames are spot welded at all connection points such as 41, 42 and 43 shown in Fig. 5.

Each center rod 38 is connected at its ends to the endless chains 21. The chains and sprockets are disposed so that the shelves move in a continuous procession up one set of spaced guide members across the frame to another pair of guide members, down that set of guide members, back across the frame to the first pair of guide members and up that set of guide members.

Sprockets 20 are fixed to shafts 44 which are mounted in adjustable shaft supports 45 so that the length of the device can be adjusted by moving the bottom sprockets. The chains 21 on the example shown may be one-half inch single pitch roller chains. The sprockets and chains may be rotated manually by sprocket 46 and handle 47 or by a motor (not shown) mounted by the bottom sprockets. The width of the device and length may vary to fit any particular need. A hinged aluminum molding can be provided to cover the device to afford beauty and protection. Any oiling system may be used, a simple and effective one being to provide oil cans with drip holes over the sprockets.

Fixed to the frame 15 is an alignment coupling 50 and fixed to each shelf is a mating coupling 51. Coupling 50 contains U-shaped arms 52 and 53 with buffer leaf springs 54 and 55 to receive the prong end 56 of couplings 51 on the shelves. The couplings 51 are adapted to pass and slide vertically through the coupling 50. Thus a dampening and alignment means is provided for the shelves to align the rollers with the tracks or guide members. While the coupling 50 is shown at the top of the frame, another may be provided at the bottom of the frame and on the other side.

While I have illustrated and described the preferred embodiment of my invention, it is to be understood that I do not limit myself to the precise construction herein disclosed and that various changes and modifications may be made within the scope of the invention as defined in the appended claim.

Having thus described my invention, what I claim as new, and desire to secure by United States Letters Patent is:

An elevating shelf device, comprising in combination a generally rectangular open frame, a first two pairs of channel-shaped guide members carried on one side of said frame, a second two pairs of channel-shaped guide members carried on the opposite side of said frame, the guide members on each of said sides being disposed vertically and the pairs being spaced apart to define two passageways on each side within said frame, each of said members having an upper curved end and a lower curved end, the curved ends of the members being inclined inwardly toward the center of each of said sides of the frame, a set of four sprocket wheels rotatably carried on each side of the frame, an endless chain passing over each set of four wheels defining a rectangular path at each side of the frame, a plurality of rods transversely disposed across the frame and carried by said chains, a plurality of shelves freely suspended by shelf frames from said rods, four guide rollers carried by each of said shelves for movement in the channels of said guide members, sprocket means arranged to move said chains simultaneously on said sprocket wheels, each of said shelf frames having angularly disposed upper sides and parallel lower sides disposed at right angles to said shelf, a collar bearing carried at each end of said rods, said angularly disposed upper sides being mounted to pivot freely on said collar bearings so that the shelves remain horizontal in all positions thereof, said chains being movable endlessly on said wheels so that the shelves move in an endless path upwardly in one pair of said passageways, then horizontally straight across the frame to the other pair of passageways, then downwardly through the other pair of passageways, and then horizontally straight across the frame to said one pair of passageways, a U-shaped member carried at the top of the frame, and a pronged member carried by each of said shelves and arranged to fit into said U-shaped member to align the rollers with the channels in said members and to dampen lateral movements of the shelves.

References Cited in the file of this patent

UNITED STATES PATENTS

| | | |
|---|---|---|
| 274,488 | Guest | Mar. 27, 1883 |
| 521,368 | Gildersleeve | June 12, 1894 |
| 1,643,224 | Shelton | Sept. 20, 1927 |
| 1,680,035 | Buckingham | Aug. 7, 1928 |
| 1,959,926 | Reich | May 22, 1934 |
| 2,261,061 | Horton | Oct. 28, 1941 |
| 2,603,547 | Zook | July 15, 1952 |